United States Patent
Chatterjee et al.

(10) Patent No.: US 10,861,437 B2
(45) Date of Patent: Dec. 8, 2020

(54) METHOD AND DEVICE FOR EXTRACTING FACTOID ASSOCIATED WORDS FROM NATURAL LANGUAGE SENTENCES

(71) Applicant: Wipro Limited, Bangalore (IN)

(72) Inventors: Arindam Chatterjee, Gondalpara (IN); Rahul Arya, Gwalior (IN)

(73) Assignee: Wipro Limited, Bangalore (IN)

(*) Notice: Subject to any disclaimer, the term of this patent is extended or adjusted under 35 U.S.C. 154(b) by 84 days.

(21) Appl. No.: 16/368,212

(22) Filed: Mar. 28, 2019

(65) Prior Publication Data
US 2020/0312297 A1 Oct. 1, 2020

(30) Foreign Application Priority Data
Mar. 28, 2019 (IN) .......................... IN201941012259

(51) Int. Cl.
*G10L 15/02* (2006.01)
*G10L 25/54* (2013.01)

(52) U.S. Cl.
CPC .............. *G10L 15/02* (2013.01); *G10L 25/54* (2013.01); *G10L 2015/027* (2013.01)

(58) Field of Classification Search
CPC .... G10L 15/02; G10L 25/54; G10L 2015/027
See application file for complete search history.

(56) References Cited

U.S. PATENT DOCUMENTS

| | | | |
|---|---|---|---|
| 7,970,767 B2 | 6/2011 | Probst et al. | |
| 10,020,076 B1 * | 7/2018 | Anumalasetty | ........ G16H 50/20 |
| 10,331,768 B2 * | 6/2019 | Patil | ....................... G06F 16/284 |
| 10,347,244 B2 * | 7/2019 | Goel | ....................... G10L 17/18 |
| 2014/0316764 A1 * | 10/2014 | Ayan | ....................... G10L 15/22 |
| | | | 704/9 |
| 2018/0308487 A1 * | 10/2018 | Goel | ....................... G10L 15/26 |
| 2019/0026389 A1 | 1/2019 | Beller et al. | |

OTHER PUBLICATIONS

Andersson, L., et al., "The Portability of Three Types of Text Mining Techniques into the Patent Text Genre", Sprinter-Verlag GmbH Germany, 2017, pp. 241-242.
Aher, A., et al., "A Survey on Semantic Role Labeling and Dependency Parsing", Semantic Role Labeling Task, 2010, 42 pages.
Wang, M., "A Survey of Answer Extraction Techniques in Factoid Question Answering", Association for Computational Linguistics, 2006, pp. 1-13.

* cited by examiner

*Primary Examiner* — Mohammad K Islam
(74) *Attorney, Agent, or Firm* — Finnegan, Henderson, Farabow, Garrett & Dunner, LLP

(57) ABSTRACT

A method an system for extracting factoid associated words from natural language sentences is disclosed. The method includes creating an input vector that includes a plurality of parameters for each target word in a sentence. For a target word, the plurality of parameters includes a Part of Speech (POS) vector, a word embedding, a word embedding for a head word of the target word, a dependency label, and a semantic role label. The method includes processing for each target word, the input vector through a trained neural network and assigning one or more factoid tags to each target word in the sentence. The method includes extracting text associated with factoids from the sentence based on the one or more factoid tags. The method further includes providing a response to the sentence inputted by the user based on the text associated with the factoids.

17 Claims, 6 Drawing Sheets

METHOD AND DEVICE FOR EXTRACTING FACTOID ASSOCIATED WORDS FROM NATURAL LANGUAGE SENTENCES

TECHNICAL FIELD

This disclosure relates generally to processing natural language sentences and more particularly to method and device for extracting factoid associated words from natural language sentences.

BACKGROUND

In today's world, customer satisfaction is the primary concern for various organizations. To this end, task automation is being implemented as a mandatory aspect, which is highly dependent on automation of human tasks. Further, efficient interaction and problem resolution with customers is a key need for any organization. Automating efficient interaction and problem resolution, requires creating an intelligent and cognitive system that efficiently handles customer interactions. Examples of such systems may include, but are not limited to conversation engines, search engines, data mining systems, information retrieval systems, question answering systems, or chatbots.

One of the key challenges in building such an intelligent and cognitive system is identifying user intent from a user query. User intent is the information pertaining to what the user wants. Conventional systems, which use Artificial Intelligence (AI) to decipher a user query content, are obsessed with user intent and its identification. However, as intelligent systems are evolving, just finding the user intent is not enough to understand a user query in its entirety, especially in systems that require specific information. The reason being that intent is just a subset of the information conveyed in a user query. In gathering the entire context of a query, accurately identifying and extracting crucial information, for example, place, time, reason, or manner, is necessary. The conventional systems fail to achieve the same. This information is not only important for understanding the complete intent of the user (Natural Language Understanding), but also vital when forming a reply to the user (Natural Language Generation).

SUMMARY

In one embodiment, a method for extracting factoid associated words from natural language sentences is disclosed. The method includes creating, by a factoid processing device, an input vector comprising a plurality of parameters for each target word in a sentence inputted by a user. The plurality of parameters for each target word includes a Part of Speech (POS) vector associated with the target word and at least two words preceding the target word, a word embedding for the target word, a word embedding for a head word of the target word in the dependency parse tree of the sentence, a dependency label for the target word, and a semantic role label of the target word. The method further includes processing for each target word, by the factoid processing device, the input vector through a trained neural network comprising a bidirectional Long Short Term Memory (LSTM) layer, an LSTM layer, a dense layer, and a Softmax layer. The trained neural network is trained to identify words associated with each of a plurality of factoids from a plurality of sentences. The method includes assigning, by the factoid processing device, factoid tags to each target word in the sentence based on processing of associated input vector through the trained neural network. The method further includes extracting, by the factoid processing device, text associated with one or more factoids of the plurality of factoids from the sentence based on the factoid tags associated with each target word in the sentence. The sentence includes text associated with the one or more factoids. The method includes providing, by the factoid processing device, a response to the sentence inputted by the user based on the text associated with the one or more factoids. The response includes at least one of an answer to a user query and an action corresponding to the user query.

In another embodiment, a factoid processing device for extracting factoid associated words from natural language sentences is disclosed. The factoid processing device includes a processor and a memory communicatively coupled to the processor, wherein the memory stores processor instructions, which, on execution, causes the processor to create an input vector comprising a plurality of parameters for each target word in a sentence inputted by a user. The plurality of parameters for each target word includes a POS vector associated with the target word and at least two words preceding the target word, a word embedding for the target word, a word embedding for a head word of the target word in the dependency parse tree of the sentence, a dependency label for the target word, and a semantic role label of the target word. The processor instructions further cause the processor to process for each target word, the input vector through a trained neural network comprising a bidirectional LSTM layer, an LSTM layer, a dense layer, and a Softmax layer. The trained neural network is trained to identify words associated with each of a plurality of factoids from a plurality of sentences. The processor instructions cause the processor to assign factoid tags to each target word in the sentence based on processing of associated input vector through the trained neural network. The processor instructions further cause the processor to extract text associated with one or more factoids of the plurality of factoids from the sentence based on the factoid tags associated with each target word in the sentence. The sentence includes text associated with the one or more factoids. The processor instructions cause the processor to provide a response to the sentence inputted by the user based on the text associated with the one or more factoids. The response includes at least one of an answer to a user query and an action corresponding to the user query.

In yet another embodiment, a non-transitory computer-readable storage medium is disclosed. The non-transitory computer-readable storage medium has instructions stored thereon, a set of computer-executable instructions causing a computer comprising one or more processors to perform steps comprising creating an input vector comprising a plurality of parameters for each target word in a sentence inputted by a user, wherein the plurality of parameters for each target word comprise a POS vector associated with the target word and at least two words preceding the target word, a word embedding for the target word, a word embedding for a head word of the target word in the dependency parse tree of the sentence, a dependency label for the target word, and a semantic role label of the target word; processing for each target word, the input vector through a trained neural network comprising a bidirectional LSTM layer, an LSTM layer, a dense layer, and a Softmax layer, wherein the trained neural network is trained to identify words associated with each of a plurality of factoids from a plurality of sentences; assigning factoid tags to each target word in the sentence based on processing of associated input vector through the trained neural network; extracting text associated with one or more factoids of the plurality of factoids from the sentence based on the factoid tags associated with each target word in the sentence, wherein the sentence comprises text associated with the one or more factoids; and providing a response to the sentence inputted by the user based on the text associated with the one or more factoids, wherein the response comprises at least one of an answer to a user query and an action corresponding to the user query.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
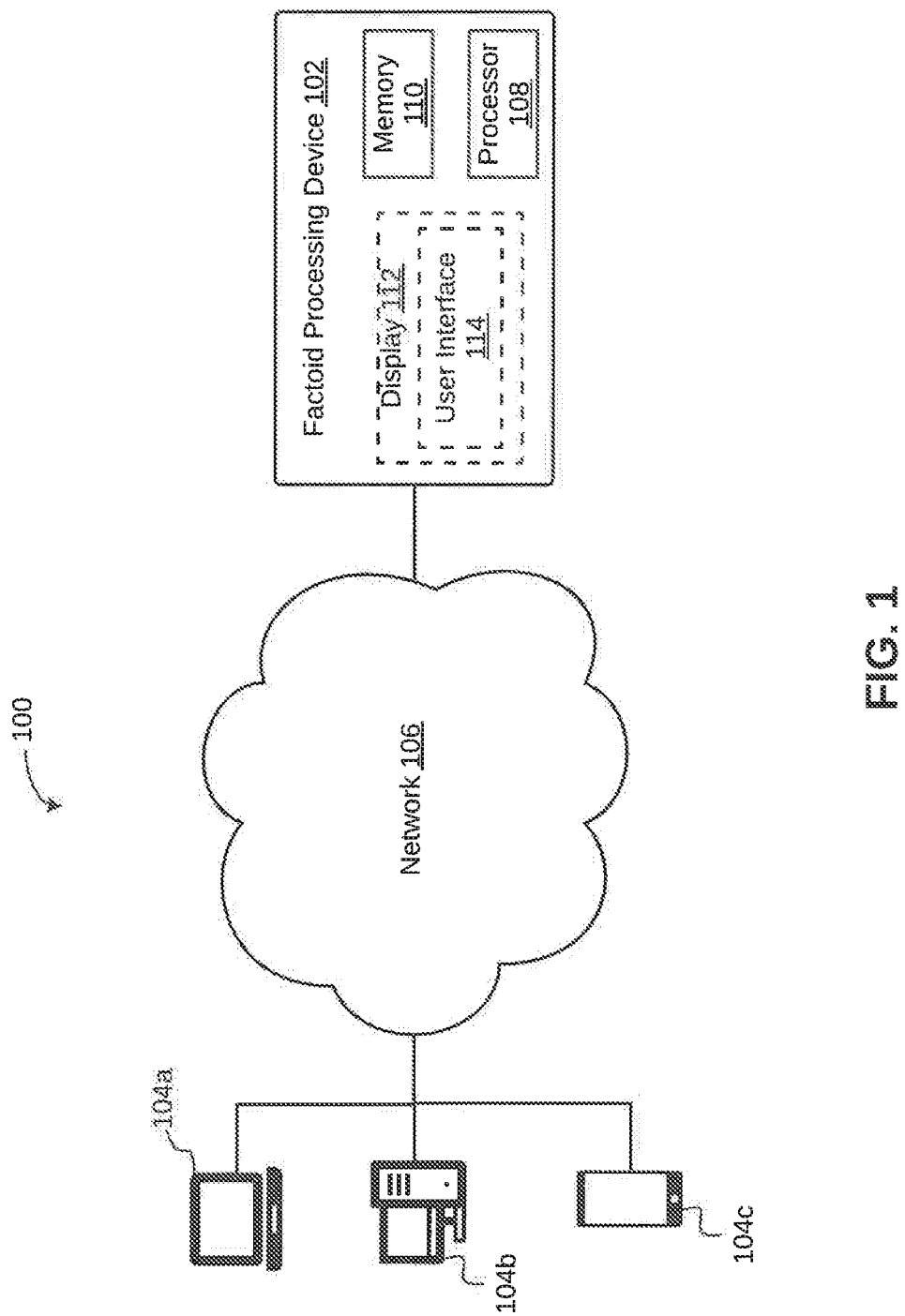
FIG. 1 is a block diagram illustrating a system for extracting factoid associated words from natural language sentences, in accordance with an embodiment.

Additional illustrative embodiments are listed below. In one embodiment, a system 100 for extracting factoids from natural language sentences is illustrated in FIG. 1. The system 100 may include a factoid processing device 102 that may be configured to extracting factoids from natural language sentences. The factoid processing device 102 may include a user interaction based cognitive system that operate based on Natural Language Understanding (NLU) and Natural Language Generation (NLG). Example of such cognitive systems or applications may include, but are not limited to dialogue based systems, conversation engines, search engines, datamining systems, text analytics systems, information retrieval systems, question answering systems, or chatbots. Natural language sentences may be inputted by a user either vocally (for example, on an Interactive Voice Response (IVR) menu) or by way of text (for example, on a chat window). Alternatively, the natural language sentences may occur within documents. Examples of these documents may include, but are not limited to portable display format (PDF) documents, images, or web-pages.

A user query, which is a natural language sentence provided vocally or by way of text by a user, may include a user intent, which indicates what a user wants or is referring to by way of the user query. However, intent is just a subset of the information conveyed in the natural language sentence, as capturing the user intent only provides an answer to "what" the user wants or is looking for. In other words, the user intent only provides partial information pertaining to what the user exactly wants. The user query may further include additional information, which may not be captured by only identifying the user intent. The additional information in the user query may include answers to queries, examples of which, may include, but are not limited to "who," "what," "when," "where," "why," or "how." The answers to such queries that may be derived out of the user query are termed as factoids, which are instrumental in identifying and extracting acute details from the user query. The factoids so derived from the user query may not only be used to understand user intent but also extract details associated with named entities, locations, or time etc. It will be apparent to a person skilled in the art that the invention is not limited to user queries and may be applicable to any natural language sentence used in a user interaction based cognitive system.

By way of an example, the user may provide the following input sentence to a cognitive system associated with the factoid processing device 102: "I want to go home tomorrow by bus, as my wife is expecting." The factoid processing device 102 may analyze the input sentence and may identify and extract one or more words, which are associated with factoids, from the input sentence. The output of the factoid processing device 102 is represented below:

Who: I.
What: want to go
When: tomorrow
Where: home
Why: wife is expecting
How: by bus After the factoid processing device 102 has extracted one or more words and their association with factoids from the input sentence, the factoid processing device 102 may provide an appropriate response or action, based on an analysis of the one or more words and their association with factoids, to the user.

Examples of the factoid processing device 102 may include, but are not limited to an application server, a laptop, a desktop, an application server, a smart phone, or a tablet. The natural language sentences may be provided by one or more users through a plurality of computing devices 104 (for example, a laptop 104a, a desktop 104b, and a smart phone 104c). The plurality of computing device 104 may be communicatively coupled to the factoid processing device 102 via a network 106. The network 106 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS).

When a user of the laptop 104a, for example, may want to interact, via voice inputs, with a cognitive or intelligent system (for example, an intelligent personal assistant, search engine, chat bots, question answering systems, conversation engines, or data mining tools) installed on the factoid processing device 102 to resolve a query, the laptop 104a may communicate with the factoid processing device 102, via the network 106. The factoid processing device 102 may then process the voice inputs (which would be one or more natural language sentences) to extract one or more words associated with factoids in the voice inputs and accordingly respond to the query. To this end, the factoid processing device 102 includes a processor 108 that is communicatively coupled to a memory 110, which may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited Dynamic Random Access Memory (DRAM), and Static Random-Access memory (SRAM).

The memory 110 may further include various modules that enable the factoid processing device 102 to extract one or more words associated with factoids from natural language sentences. These modules are explained in detail in conjunction with FIG. 2. The factoid processing device 102 may further include a display 112 having a User Interface (UI) 114 that may be used by a user or an administrator to provide queries (either verbal or textual) and various other inputs to the factoid processing device 102. The display 112 may further be used to display a response or resolution to the query provided by the user. The functionality of the factoid processing device 102 may alternatively be configured within each of the plurality of computing devices 104.

Figure 2:
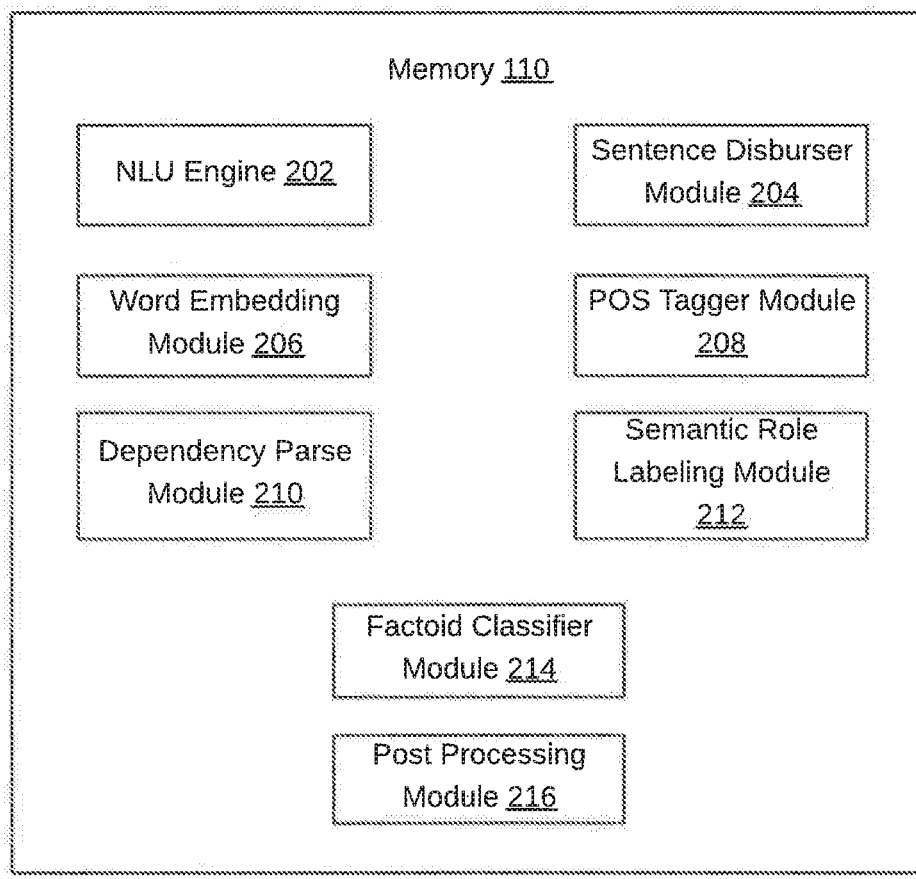
FIG. 2 is a block diagram illustrating various modules within a memory of a factoid processing device configured to extract factoid associated words from natural language sentences, in accordance with an embodiment.

Referring now to FIG. 2, a block diagram of various modules within memory 110 of the factoid processing device 102 configured to extract factoid associated words from natural language sentences is illustrated, in accordance with an embodiment. Memory 110 includes a Natural Language Understanding (NLU) engine 202, a sentence disburser module 204, a word embedding module 206, a Part of Speech (POS) tagger module 208, a dependency parse module 210, a semantic role labelling module 212, a factoid classifier module 214, and a post processing module 216.

The NLU engine 202 may receive text in natural language and may decipher the content, intent, and several other granular details from the text. Examples of NLU Engine 202 may include, but are not limited to search engines, chat bots, question answering systems, conversation engines, intelligent personal assistants, or data mining tools. Thereafter, the sentence disburser module 204 obtains raw text from the NLU Engine 202 as input. The sentence disburser module 204 then breaks down the raw text into sentences from which words associated with factoids need to be identified from within the sentences. The sentences are then disbursed to subsequent modules one by one.

The word embedding module 206 receives entire corpora of sentences from the sentence disburser module 204 and computes word embeddings for every word in a knowledge resource. Word embeddings are representations of a word in a low-dimensional vector space (for example, 300 dimensions). Word embeddings map a word in raw text to a vector in a pre-decided vector space. The dimensions are latent and are obtained using the knowledge base. These vectors are used to capture some notion of the syntactic and semantic features of a word in a context. Word embedding may be computed using several algorithms, for example, 'word2vec' and 'GloVe'. This is further explained in detail in conjunction with FIG. 3.

The POS tagger module 208 receives a natural language sentence as input and tags each item (word and punctuation) in the sentence with part-of-speech. This is further explained in detail in conjunction with FIG. 3. The dependency parse module 210 receives a natural language sentence as an input and generates a dependency parse tree for the given sentence. The dependency parse tree is generated based on the intrinsic dependencies of the words in the sentence with each other. By way of an example, the dependency parse module 210 identifies the subject, main verb, and predicate or object in a natural language sentence as well as many other dependencies. This is further explained in detail in conjunction with FIG. 3.

The semantic role labelling module 212 takes natural language sentences as input. Thereafter, the semantic role labelling module 212 generates semantic role labels for each natural language sentence, based on verbs and agents in the sentence. This is further explained in detail in conjunction with FIG. 3.

Each of the word embedding module 206, the POS tagger module 208, the dependency parse module 210, and the semantic role labelling module 212, may provide inputs to the factoid classifier module 214. The factoid classifier module 214 may include artificial neural network model that takes POS tags, the dependency parse tree, semantic role labels, and word embeddings of words as features.

A raw corpus of natural language sentences is taken and each sentence is tagged with a plurality of factoid tags, which may include, but are not limited to a begin who tag, an inside who tag, a begin what tag, an inside what tag, a begin where tag, an inside where tag, a begin when tag, an inside when tag, a begin how tag, an inside how tag, a begin why tag, an inside why tag, or others tag. This generates a labelled or tagged corpus, Each tagged sentence along with the features mentioned above, is fed to the factoid classifier module 214 for training it to differentiate factoid associated words from others. The working of the factoid classifier module 214 has been explained in detail in conjunction with FIG. 3. The post processing module 216 accepts a sentence tagged with factoid tags assigned by the factoid classifier module 214 and extracts text associated with factoids from the sentence. This is further explained in detail in conjunction with FIG. 3.

Figure 3:
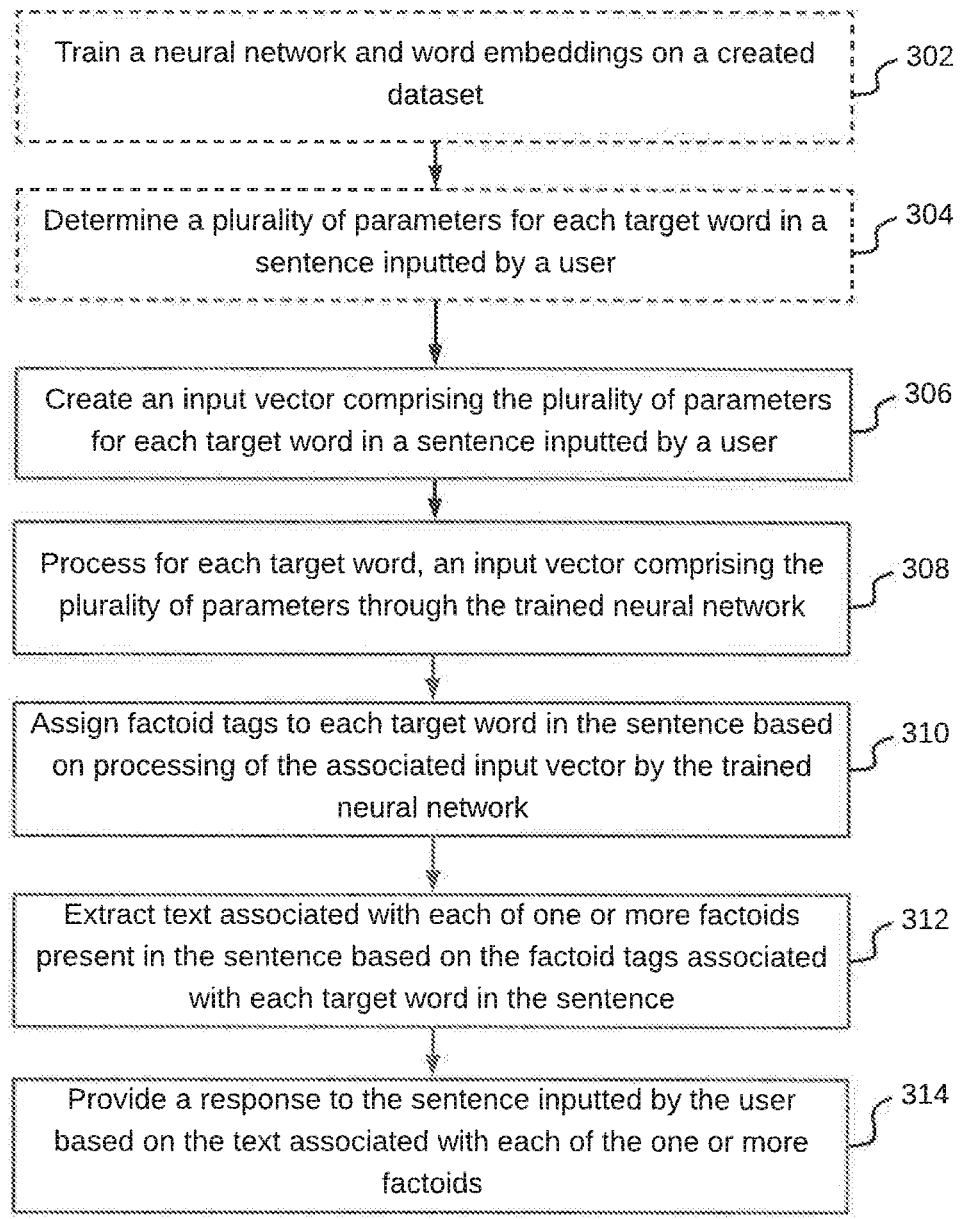
FIG. 3 illustrates a flowchart of a method for extracting factoid associated words from natural language sentences, in accordance with an embodiment.

Referring now to FIG. 3, a flowchart of a method for extracting factoid associated words from natural language sentences is illustrated, in accordance with an embodiment. At step 302, the factoid processing device 102 may train a neural network and word embedding based on a created dataset, to identify one or more words associated with factoids in sentences inputted by a user. The created dataset is explained below as the knowledge base from which data is extracted and fed into the word embedding module 206. This is also further explained in detail in conjunction with FIG. 4. The sentences inputted by the user are natural language sentences.

The neural network includes a bidirectional Long Short Term Memory (LSTM) layer, an LSTM layer, a dense layer, and a Softmax layer. The bidirectional LSTM neural network is a particular type of Recurrent Neural Network (RNN) and is selected because textual data is sequential, and RNNs are better suited for sequential type of data. The architecture of the bidirectional LSTM neural network is a Bidirectional one, which enables it to scan the input both backwards and forwards. This goes in sync with dependency parse based features used in the input vector. Plain RNNs may be considered a special case of LSTMs. If all the input gates are fixed at 1's, all the forget gates to 0's (the previous memory is always forgotten), and all the output gates to 1's (thus the whole memory is exposed), a standard RNN is obtained. There is an additional 'tan h' function that squashes the output a bit. The gating mechanism is what allows LSTMs neural network to explicitly model long-term dependencies. By learning the parameters for its gates, the LSTMs neural network learns how its memory should behave.

The data used to train the neural network may primarily be extracted from generic corpora, for example, news and blogs, and may include a set of documents or articles. By way of an example, BBC news dataset with over a million words may be use for data extraction. The data may be extracted and collected in the form of a raw text corpus that includes hundreds and thousands of natural language sentences. The data may be used to extract key ingredients and is also labelled with one or more factoid tags in order to train the neural network. The one or more factoid tags may include, but are not limited to a begin who tag, an inside who tag, a begin what tag, an inside what tag, a begin where tag, an inside where tag, a begin when tag, an inside when tag, a begin how tag, an inside how tag, a begin why tag, an inside why tag, or others tag. These are explained in detail below. Additionally, in order to train the neural network, such that, commendable accuracies are achieved in identifying words associated with factoids, the data is collated in such a way that it is as varied as possible. This increases the span and variance of the data, thereby reducing chances of the neural network coming across completely unseen pattern instances.

To train the neural network, the extracted data, which acts as knowledge base, is manually tagged with the plurality of factoid tags. These factoid tags are required by the neural network to understand the role of a word in a context. In an embodiment, the plurality of factoid tags that may be used to tag words in the knowledge base may be represented as follows:

'B-Who'—This tag means "Begin-Who" and indicates that a word marks beginning of text associated with a factoid within a sentence, which is an answer to a "who" query.

'I-Who'—This tag means "Inside-Who" and indicates that a word is part of text associated with a factoid within a sentence, which is an answer to a "who" query 'B-What'—This tag means "Begin-What" and indicates that a word marks beginning of text associated with a factoid within a sentence, which is an answer to a "what" query.

'I-What'—This tag means "Inside-What" and indicates that a word is part of text associated with a factoid within a sentence, which is an answer to a "what" query.

'B-Where'—This tag means "Begin-Where" and indicates that a word marks beginning of text associated with a factoid within a sentence, which is an answer to a "where" query.

'I-Where'—This tag means "Inside-Where" and indicates that a word is part of text associated with a factoid within a sentence, which is an answer to a "where" query.

'B-Why'—This tag means "Begin-Why" and indicates that a word marks beginning of text associated with a factoid within a sentence, which is an answer to a "why" query.

'I-Why'—This tag means "Inside-Why" and indicates that a word is part of text associated with a factoid within a sentence, which is an answer to a "why" query.

'B-When'—This tag means "Begin-When" and indicates that a word marks beginning of text associated with a factoid within a sentence, which is an answer to a "when" query.

'I-When'—This tag means "Inside-When" and indicates that a word is part of text associated with a factoid within a sentence, which is an answer to a "when" query.

'B-How'—This tag means "Begin-How" and indicates that a word marks beginning of text associated with a factoid within a sentence, which is an answer to a "how" query.

'I-How'—This tag means "Inside-How" and indicates that a word is part of text associated with a factoid within a sentence, which is an answer to a "how" query.

'O'—This is the "Others" tag and indicates that a word neither marks beginning of text associated with a factoid in the sentence nor is a part of text associated with a factoid.

By way of an example, for the sentence: "Vikram's brother wants to go home tomorrow by bus, as his wife is expecting" factoid tags may be assigned manually as represented below:

Vikram's—B-Who
brother—I-Who
wants—B-What
to —I-What
go—I-What
home—B-Where
tomorrow—B-When
by —B-How
bus—I-How
as —O
his—O
wife—B-Why
is —I-Why
expecting—I-Why Thus, the words "Vikram's brother" are marked as text associated with a factoid which is an answer to the question "Who." The words "wants to go" are marked as text associated with a factoid which is an answer to the question "What." The word "home" is marked as text associated with a factoid which is an answer to the question "Where." The word "tomorrow" is marked as text associated with a factoid which is an answer to the question "When." The words "by bus" are marked as text associated with a factoid which is an answer to the question "How." The words "wife is expecting" are marked as text associated with a factoid which is an answer to the question "Why." Finally, the words "as his" are marked as text not associated with any factoid. Once the extracted data is assimilated and prepared, the neural network is trained based on the factoid tags assigned to words in sentences.

Further, in order to extract word embeddings for words in the extracted data, which is a raw text corpus, the extracted data is fed into the word embedding module 206 in the factoid processing device 102. The word embedding module 206 may be, a shallow artificial neural net that captures semantic and syntactic essence of words in a context. As a result, word embeddings for each word in the extracted data is obtained and latent semantic relationships among words is also extracted. As the extracted data used for training is generic, varied, and large in size, the factoid processing device 102 works across most occurrences of factoids in different sentences.

A word embedding for a words is a vector representation of the word. This vector represents the syntactic and semantic essence of that word, occurring in a context. Using this vector representation, words that are unseen to the neural network may also be efficiently handled. In order to obtain word embedding, the input is a word from the knowledge base and output is the context of the word. The context of the word may have a window size of 10, for example, which may be an average sentence size in the knowledge base. Thus, a word is represented by the context of the words in its vicinity. By way of an example, the words 'home' and 'abode' may appear in similar contexts in the knowledge base, thus their vector representation may be similar and the bidirectional LSTM neural network may predict them correctly. As continuation of the example above, the word 'home' may have been used to train the neural network to tag the word 'home' as a word associated with a factoid in a sentence. As the neural network is trained using word embeddings, when it encounters the word 'abode' (which may be a new word), the neural network will classify the word 'abode' also as a word associated with a factoid within a sentence. This is because vector representation of the words 'home' and 'abode' may be similar.

Once the neural network has been trained, a sentence may be inputted by a user in the form of a textual input or a vocal input. The sentence may be provided to an intelligent system (or man machine interface system) installed on the factoid processing device 102. Examples of the intelligent system may include, but are not limited to an intelligent personal assistant, search engine, chat bots, question answering systems, conversation engines, or data mining tools.

At step 304, the factoid processing device 102 determines a plurality of parameters for each target word in the sentence inputted by the user. For a target word, the plurality of parameters include a POS vector associated with the target word. The POS vector includes a POS tag for the target word and a POS tag for two or more words preceding the target word in the sentence. For each target word, a POS vector is considered because in a sentence, the label of a target word depends on the context of the previous words in the sentence. For an input sentence in natural language, each word is tagged with an appropriate POS tag. Examples of POS tags may include, but are not limited to NNP, i.e.; proper noun, VB, i.e., verb, PRP, i.e., preposition, NN, i.e., noun, RB, i.e., adverb, and IN, i.e., interjection. By way of an example, for the sentence: "I could not go to my office as it was raining," will be POS tagged as represented by (1):

$$\text{I/PRP could/VB not/RB go/VB to/TO my/PRP office/} \\ \text{NN as/IN it/PRP was/VB raining/VB} \quad (1)$$

For a target word in a sentence, the POS vector may be represented using equation 3 given below:

$$\text{POS Vector} = (x_{i-2}, x_{i-1}, x_i) \quad (2)$$

where, $x_i$ is the POS tag assigned to the target word;

$x_{i-1}$ is the POS tag assigned to the first word immediately preceding the target word in the sentence;

$x_{i-2}$ is the POS tag assigned to the second word immediately preceding the target word in the sentence.

Thus, a POS vector for each word in the sentence inputted by the user will be determined. In continuation of the example given above, for the word "raining," the two preceding words are "it" and "was." Thus, the POS vector for the word "raining" is represented by 4:

$$\text{POS vector for "raining"} = (PRP, VB, VB) \quad (3)$$

The plurality of parameters for the target word further include a word embedding of the target word and a word embedding for a head word of the target word in a dependency parse tree for the sentence. This may be represented by (4) and (5) below:

$$\text{Word embedding for the target word} - W_i \quad (4)$$

$$\text{Word embedding for the head word} - W_h \quad (5)$$

A head word for the target word may be determined based on a dependency parse tree made for the sentence. The dependency parse tree depicts dependencies between words within the sentence. In a dependency parse tree, the grammatical structure of the sentence is also analyzed thereby establishing relationships between head words and words which modify these head words. The dependency parse tree may include two parts. i.e., a parse tree and dependencies among the words in the sentence. These dependencies include different dependency labels. By way of an example, a parse tree for the following sentence: "I could not go to my office as it was raining" is depicted below:

```
(ROOT
  (S
    (NP (PRP I))
    (VP (MD could) (RB not)
      (VP (VB go)
        (PP (TO to)
          (NP (PRP$ my) (NN office)))
        (SBAR (IN as)
          (S
            (NP (PRP it))
            (VP (VBD was)
              (VP (VBG raining)))))))))
```

The dependencies for the above parse tree, which may be determined based on Stanford type dependencies, are depicted below. The dependencies include multiple dependency labels. The Stanford type dependencies are explained in detail in the paper titled "Stanford Typed Dependencies Manual," authored by Marie-Catherine de Marneffe and Christopher D. Manning, and published in September 2008. The paper can be accessed here: "https://nlp.stanford.edu/software/dependencies_manual.pdf"

nsubj(go-4, I-1)
aux(go-4, could-2)
neg(go-4, not-3)
root(ROOT-0, go-4)
case(office-7, to-5)
nmod:poss(office-7, my-6)
nmod(go-4, office-7)
mark(raining-11, as-8)
nsubj(raining-11, it-9)
aux(raining-11, was-10)
advcl(go-4, raining-11)

The dependencies are based on head word for each target word. For example, the dependency label: nsubj (go-4, I-1) implies that "I" is the subject of the sentence and the head word is the verb "go."

The plurality of parameters for the target word further include a dependency label for the target word. The dependency label for the target word indicates relation of the target with the head word in the sentence. The dependency label for the target word may be depicted by (6) given below:

$$\text{Dependency label for the target word} - D_i \quad (6)$$

The plurality of parameters for the target word further include a semantic role label for the target word. In semantic role labeling or shallow semantic parsing roles are assigned to parts of a sentence or piece of text with respect to the main verb in the sentence. The subsets of the text to which roles are assigned to, are termed as agents. In an embodiment, the agents may be in the form of goals and results. By way of an example, for the sentence "Vikram's brother wants to go home tomorrow by bus, as his wife is expecting," the semantic role label may be identified as depicted below:

"Vikram's brother"—A0
"wants"—Verb
"to go home by bus"—A1
"as his wife is expecting"—CAU As depicted above, the main verb in the sentence is identified as "wants," "Vikram's brother" and "to go home by bus" are identified as agents, and "as his wife is expecting" is identified as the causal in the sentence. The semantic role label for the target word may be depicted by (7) given below:

$$\text{Semantic role label for the target word} - S_i \qquad (7)$$

Once the plurality of parameters discussed above have been determined for each target word, the factoid processing device 102, at step 306 creates an input vector that includes the plurality of parameters for each target word in the sentence inputted by the user. The input vector includes the plurality of parameters determined at (2), (4), (5), (6), and (7) given above. The input vector at time T may be depicted by equation (8) given below:

$$x_t = (x_{i-2}, x_{i-1}, x_i, W_p, W_h, D_i, S_i) \qquad (8)$$

where,
$x_t$ is the input vector.

Thereafter, the factoid processing device 102, at step 308, processes the input vector for each target word. As discussed in step 302, the trained neural network is trained to identify words associated with each of the plurality of factoids from a plurality of sentences. The input vector may thus be fed into the neural network that includes a bidirectional LSTM layer, an LSTM layer, a dense layer, and a Softmax layer. The bidirectional LSTM neural network which is a particular type of RNN. The architecture of the trained bidirectional LSTM neural network is a bidirectional one. This enables the trained the bidirectional LSTM neural network to scan the input both backwards and forwards. This goes in sync with dependency parse based features used in the input vector. In a deep neural network, simply providing word embeddings of the input text would have sufficed. However, the embodiment provides extra features to the trained neural network, as the relationships between individual word tokens as well as parts-of-speech are relevant features, and enable the trained neural network to perform more efficiently. As identifying words associated with factoids within a sentence is a complex task, the input vector of this embodiment is required to include more vivid details, when compared with conventional techniques that use simpler input vectors for simpler deep learning architectures. The processing of an input sentence through various layers of the trained neural network is depicted in conjunction with an exemplary embodiment given in FIG. 5.

Based on processing of associated input vector using the neural network, the factoid processing device 102, at step 310, assigns factoid tags to each target word in the sentence. Thus, each word in the sentence is tagged with one or more of the following factoid tags: B-Who, I-Who, B-What, I-What, B-Where, I-Where, B-When, When, B-How, I-How, B-Why, I-Why, and O. These factoid tags have been explained in detail before. By way of an example, for the sentence: "Vikram's brother wants to go home tomorrow by bus, as his wife is expecting", after input vectors for each word in this sentence are processed by the trained neural network, the following factoid tags are assigned to each word in the sentence:

Vikram's—B-Who
brother—I-Who
wants—B-What
to—I-What
go—I-What
home—B-Where
tomorrow—B-When
by—B-How
bus—I-How
as—O
his—O
wife—B-Why
is—I-Why
expecting—I-Why Based on the factoid tags assigned to each target word in the sentence, the factoid processing device 102, at step 312, extracts the text associated with one or more factoids of the plurality of factoids from the sentence. The sentence includes text associated with the one or more factoids. In other words, all the words present the sentence that are associated with factoids are identified and extracted. In continuation of the example given above, text associated with the one or more factoids is represented as given below:

Who: Vikram's brother
What: wants to go
When: tomorrow
Where: home
Why: wife is expecting
How: by bus The extracted text associated with one or more factoids, may then be fed into a man machine interface based cognitive and intelligent system installed on the factoid processing device 102, for example, a search engine, a chat bot, a dialogue based system, or a question answering system. The cognitive and intelligent system is able to dissect the sentence to understand intent, named entities, locations, or time etc. At step 314, the factoid processing device 102 may provide a response to the sentence inputted by the user based on the extracted text associated with one or more factoids fed into the intelligent system. The response may include one or more of an answer to a user query and an action corresponding to the user query. Since, based on the extracted text associated with one or more factoids, the cognitive and intelligent system is able to accurately determine words associated with factoids in the sentence provided by the user, the cognitive and intelligent system is able to provide a very relevant response to the user.

By way of an example, a user may have a chain of hotels, where a chat interface implementing the embodiment discussed above is used to facilitate hotel booking. The user via the chat may want to know names of customers who have checked in and checked out before 11 am in the last two days. To facilitate the same, words associated with factoids may be extracted from user queries received in the last two days though the chat interface. The words associated with factoids in the user queries for the question "what," may determine check-in and check-out times for the clients. The words associated with factoids in the user queries for the question "when," may determine relevant cases where check-out was performed before 11 am. Lastly, the words associated with factoids in the user queries for the question "who," may determine name of the customers who checked-out before 11 am.

Figure 4:
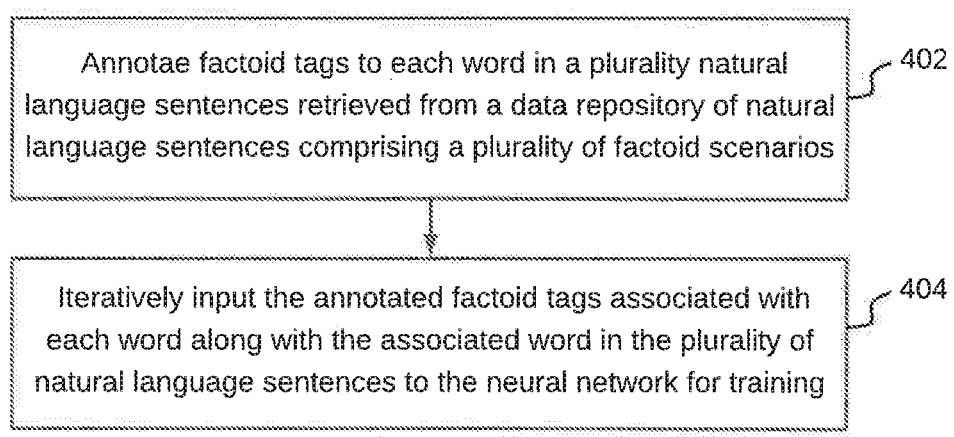
FIG. 4 illustrates a flowchart of a method for training a neural network to extract factoid associated words from natural language sentences, in accordance with an embodiment.

Referring now to FIG. 4, a flowchart of a method for training a neural network to extract factoid associated words from natural language sentences, in accordance with an embodiment. At step 402, factoid tags are annotated to each word in a plurality natural language sentences retrieved from a data repository. The data repository includes natural language sentences that include a plurality of factoid scenarios. As explained earlier, the data used to train the neural network may primarily be extracted from generic corpora, for example, news and blogs, and may include a set of documents or articles, to create a data repository. The data may be extracted and collected in the form of a raw text corpus that includes hundreds and thousands of natural language sentences. In an embodiment, only those natural language sentences that include a factoid scenario, may be retained in the data repository.

Thereafter, at step 404, the annotated factoid tags associated with each word along with the associated word in a plurality of natural language sentences are iteratively inputted to the neural network in order to train the neural network. This has been explained in detail in conjunction with the step 302 in FIG. 3.

Figure 5:
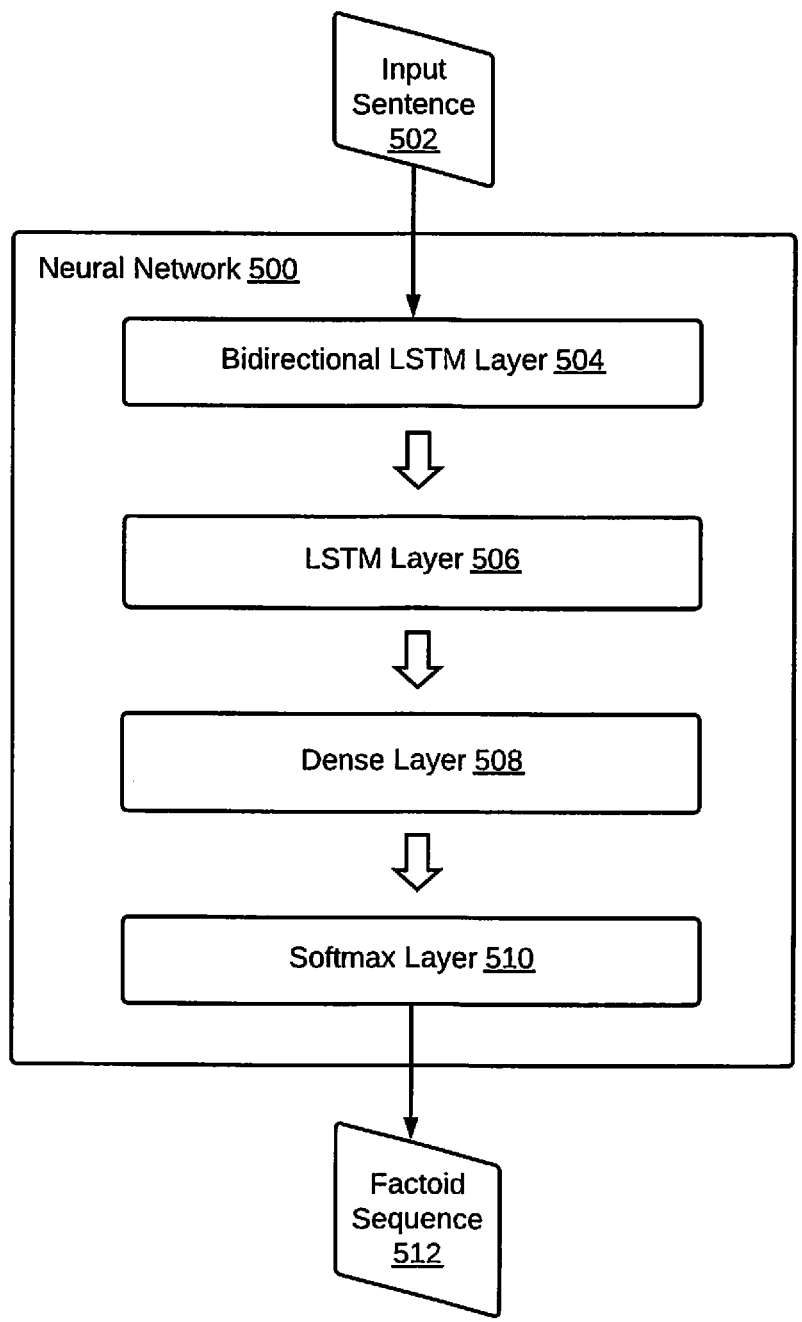
FIG. 5 illustrates a trained neural network comprising various layers configured to extract factoid associated words from natural language sentences, in accordance with an exemplary embodiment.

Referring now to FIG. 5, a trained neural network 500 that includes various layers configured to extract factoid associated words from natural language sentences is illustrated, in accordance with an exemplary embodiment. The trained neural network 500 is provided an input sentence 502, which is processed in a sequence by a bidirectional LSTM layer 504, an LSTM layer 506, a dense layer 508, and a Softmax layer 510 (or a sigmoid layer). The Softmax layer 510 finally outputs a factoid sequence 512. The generation of factoid sequence has already been explained in detail in conjunction with steps 310 and 312 in FIG. 3.

Figure 6:
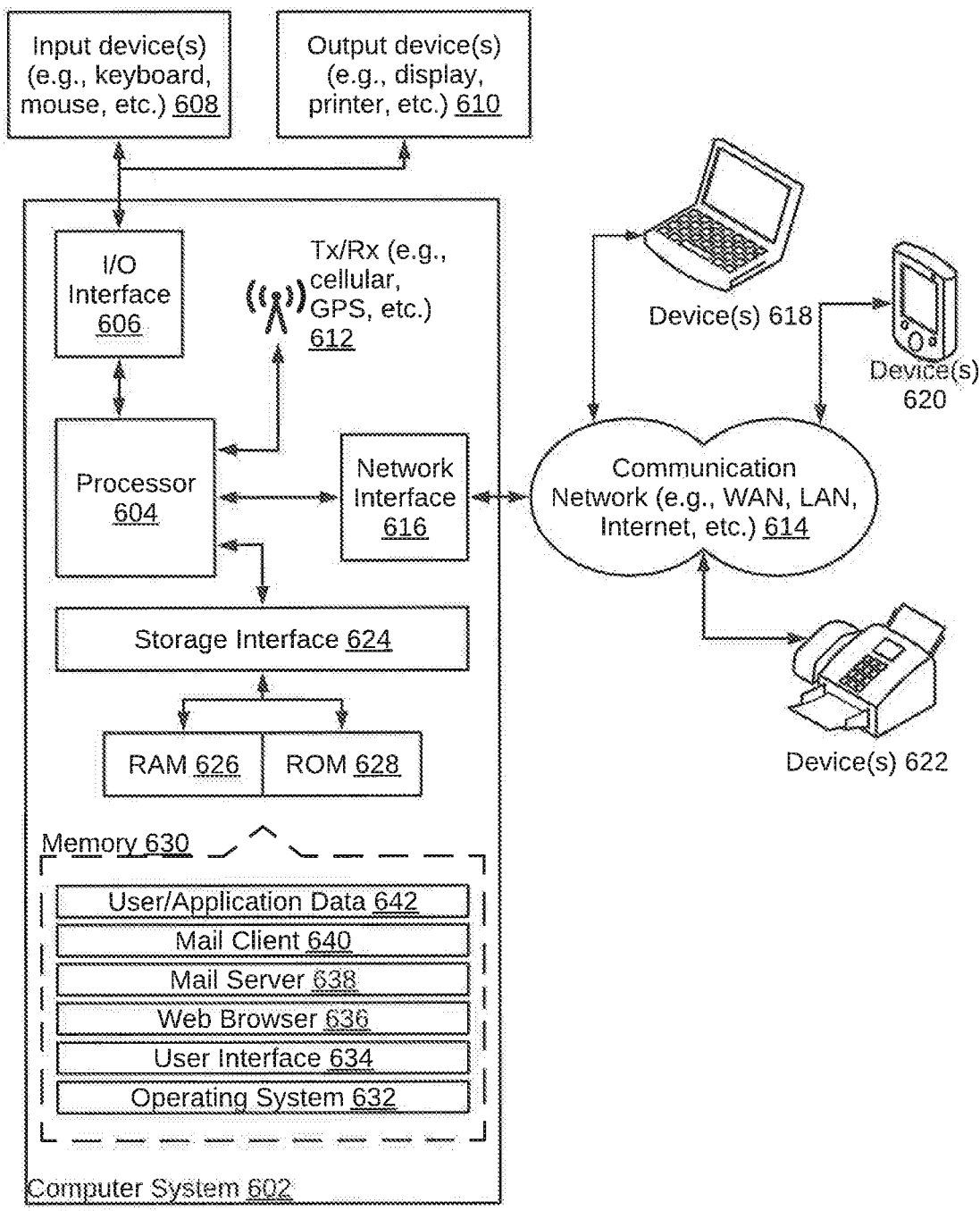
FIG. 6 illustrates a block diagram of an exemplary computer system for implementing various embodiments.

FIG. 6 is a block diagram of an exemplary computer system for implementing various embodiments. Computer system 602 may include a central processing unit ("CPU" or "processor") 604. Processor 604 may include at least one data processor for executing program components for executing user- or system-generated requests. A user may include a person, a person using a device such as such as those included in this disclosure, or such a device itself. Processor 604 may include specialized processing units such as integrated system (bus) controllers, memory management control units, floating point units, graphics processing units, digital signal processing units, etc. Processor 604 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 604 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 604 may be disposed in communication with one or more input/output (I/O) devices via an I/O interface 606. I/O interface 606 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 606, computer system 602 may communicate with one or more I/O devices. For example, an input device 608 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 610 may be a printer, fax machine, video display (e.g., cathode ray tube (CRT), liquid crystal display (LCD), light-emitting diode (LED), plasma, or the like), audio speaker, etc. In some embodiments, a transceiver 612 may be disposed in connection with processor 604. Transceiver 612 may facilitate various types of wireless transmission or reception. For example, transceiver 612 may include an antenna operatively connected to a transceiver chip (e.g., TEXAS® INSTRUMENTS WILINK WL1283® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPNHSUPA communications, etc.

In some embodiments, processor 604 may be disposed in communication with a communication network 614 via a network interface 616. Network interface 616 may communicate with communication network 614. Network interface 616 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 614 may include, without limitation, a direct interconnection, local area network (LAN), wide area network (WAN), wireless network (e.g., using Wireless Application Protocol), the Internet, etc. Using network interface 616 and communication network 614, computer system 602 may communicate with devices 618, 620, and 622. These devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 602 may itself embody one or more of these devices.

In some embodiments, processor 604 may be disposed in communication with one or more memory devices (e.g., RAM 626, ROM 628, etc.) via a storage interface 624. Storage interface 624 may connect to memory 630 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 630 may store a collection of program or database components, including, without limitation, an operating system 632, user interface application 634, web browser 636, mail server 638, mail client 640, user/application data 642 (e.g., any data variables or data records discussed in this disclosure), etc. Operating system 632 may facilitate resource management and operation of computer system 602. Examples of operating systems 632 include, without limitation, APPLE® MACINTOSH® OS X platform, UNIX platform, Unix-like system distributions (e.g., Berkeley Software Distribution (BSD), FreeBSD, NetBSD, Open-BSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 634 may facilitate display, execution, interaction, manipulation, or operation of program components through textual or graphical facilities. For example, user interfaces may provide computer interaction interface elements on a display system operatively connected to computer system 602, such as cursors, icons, check boxes, menus, scrollers, windows, widgets, etc. Graphical user interfaces (GUIs) may be employed, including, without limitation, APPLE® Macintosh® Operating Systems® AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 602 may implement a web browser 636 stored program component. Web browser 636 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 602 may implement a mail server 638 stored program component. Mail server 638 may be an Internet mail server such as MICROSOFT® EXCHANGE® mail server, or the like. Mail server 638 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 638 may utilize communication protocols such as internet message access protocol ((MAP), messaging application programming interface (MAPI), Microsoft Exchange, post office protocol (POP), simple mail transfer protocol (SMTP), or the like. In some embodiments, computer system 602 may implement a mail client 640 stored program component. Mail client 640 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 602 may store user/application data 642, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and device for extracting factoid associated words from natural language sentences. When user provide a user input, the user input is first broken down into individual sentences. Each sentence in turn is fed to a POS tagger, a dependency parser, a word embedding extractor, end a semantic role labeller. The outputs from these modules form the feature set of a neural network classifier that is trained earlier. These features are passed into the neural network model, which classifies each word as being associated with a factoid within a sentence or otherwise, and returns the text, tagged with factoid tags. This output is then processed and the final result, demarcating the text associated with factoids in individual sentences is returned.

The proposed solution extracts complete content of a user utterance or query provided by the user and not only the user intent. The proposed solution does not use a rule based approach and does not use dependency parsing and semantic role labeler for factoid extraction. Instead the proposed solution instead uses dependency parsing and semantic role labeler as features for a deep learning model and to train a neural network. The proposed solution extracts deep contextual understanding of a user query and thus can be used in a lot of NLU tasks concerned with understanding content of the user. As a result, the proposed system may be used by a customer as an interface in their natural language understanding systems. The system extracts all available user information from a query and categorizes them into different factoids. This can be of immense help to the customer, for their chatbots, search engines, or question-answering systems.

The specification has described method and device for extracting factoid associated words from natural language sentences. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for extracting factoid associated words from natural language sentences, the method comprising:
    creating, by a factoid processing device, an input vector comprising a plurality of parameters for each target word in a sentence inputted by a user, wherein the plurality of parameters for each target word comprise a Part of Speech (POS) vector associated with the target word and at least two words preceding the target word, a word embedding for the target word, a word embedding for a head word of the target word in a dependency parse tree of the sentence, a dependency label for the target word, and a semantic role label of the target word;
    processing for each target word, by the factoid processing device, the input vector through a trained neural network comprising a bidirectional Long Short Term Memory (LSTM) layer, an LSTM layer, a dense layer, and a Softmax layer, wherein the trained neural network is trained to identify words associated with each of a plurality of factoids from a plurality of sentences;
    assigning, by the factoid processing device, one or more factoid tags to each target word in the sentence based on processing of associated input vector through the trained neural network;
    extracting, by the factoid processing device, text associated with one or more factoids of the plurality of factoids from the sentence based on the one or more factoid tags associated with each target word in the sentence, wherein the sentence comprises text associated with the one or more factoids; and
    providing, by the factoid processing device, a response to the sentence inputted by the user based on the text associated with the one or more factoids, wherein the response comprises at least one of an answer to a user query and an action corresponding to the user query.

2. The method of claim 1, wherein the plurality of factoids comprises at least one of who, what, when, what, why, or how.

3. The method of claim 1 further comprising determining the plurality of parameters for each target word in the sentence inputted by the user.

4. The method of claim 1, wherein the dependency label for the target word indicates relation of the target word with the head word in the sentence.

5. The method of claim 1 further comprising training the neural network to identify one or more factoid tags for words within sentences.

6. The method of claim 5, wherein training the neural network comprises:
    annotating one or more factoid tags to each word in a plurality natural language sentences retrieved from a data repository of natural language sentences comprising a plurality of factoid scenarios; and
    inputting, iteratively, the annotated one or more factoid tags associated with each word along with the associated word in a plurality of natural language sentences to the neural network for training.

7. The method of claim 1, wherein the one or more factoid tags comprise a begin who tag, an inside who tag, a begin what tag, an inside what tag, a begin where tag, an inside where tag, a begin when tag, an inside when tag, a begin how tag, an inside how tag, a begin why tag, an inside why tag, or others tag.

8. The method of claim 7, wherein a begin tag marks a first word of text associated with a factoid and an inside tag marks subsequent words of the text associated with the factoid.

9. A factoid processing device for extracting factoid associated words from natural language sentences, the factoid processing device comprising:
    a processor; and
    a memory communicatively coupled to the processor, wherein the memory stores processor instructions, which, on execution, causes the processor to:
        create an input vector comprising a plurality of parameters for each target word in a sentence inputted by a user, wherein the plurality of parameters for each target word comprise a Part of Speech (POS) vector associated with the target word and at least two words preceding the target word, a word embedding for the target word, a word embedding for a head word of the target word in a dependency parse tree of the sentence, a dependency label for the target word, and a semantic role label of the target word;
        process for each target word, the input vector through a trained neural network comprising a bidirectional Long Short Term Memory (LSTM) layer, an LSTM layer, a dense layer, and a Softmax layer, wherein the trained neural network is trained to identify words associated with each of a plurality of factoids from a plurality of sentences;
        assign one or more factoid tags to each target word in the sentence based on processing of associated input vector through the trained neural network;
        extract text associated with one or more factoids of the plurality of factoids from the sentence based on the one or more factoid tags associated with each target word in the sentence, wherein the sentence comprises text associated with the one or more factoids; and
        provide a response to the sentence inputted by the user based on the text associated with the one or more factoids, wherein the response comprises at least one of an answer to a user query and an action corresponding to the user query.

10. The factoid processing device of claim 9, wherein the plurality of factoids comprises at least one of who, what, when, what, why, or how.

11. The factoid processing device of claim 9, wherein the processor instructions further cause the processor to determine the plurality of parameters for each target word in the sentence inputted by the user.

12. The factoid processing device of claim 9, wherein the dependency label for the target word indicates relation of the target word with the head word in the sentence.

13. The factoid processing device of claim 9, wherein the processor instructions further cause the processor to train the neural network to identify one or more factoid tags for words within sentences.

14. The factoid processing device of claim 13, wherein to train the neural network, the processor instructions further cause the processor to:
 annotate one or more factoid tags to each word in a plurality natural language sentences retrieved from a data repository of natural language sentences comprising a plurality of factoid scenarios; and
 input, iteratively, the annotated one or more factoid tags associated with each word along with the associated word in a plurality of natural language sentences to the neural network for training.

15. The factoid processing device of claim 9, wherein the one or more factoid tags comprise a begin who tag, an inside who tag, a begin what tag, an inside what tag, a begin where tag, an inside where tag, a begin when tag, an inside when tag, a begin how tag, an inside how tag, a begin why tag, an inside why tag, or others tag.

16. The factoid processing device of claim 15, wherein a begin tag marks a first word of text associated with a factoid and an inside tag marks subsequent words of the text associated with the factoid.

17. A non-transitory computer-readable storage medium having stored thereon, a set of computer-executable instructions causing a computer comprising one or more processors to perform steps comprising:
 creating an input vector comprising a plurality of parameters for each target word in a sentence inputted by a user, wherein the plurality of parameters for each target word comprise a Part of Speech (POS) vector associated with the target word and at least two words preceding the target word, a word embedding for the target word, a word embedding for a head word of the target word in a dependency parse tree of the sentence, a dependency label for the target word, and a semantic role label of the target word;
 processing for each target word, the input vector through a trained neural network comprising a bidirectional Long Short Term Memory (LSTM) layer, an LSTM layer, a dense layer, and a Softmax layer, wherein the trained neural network is trained to identify words associated with each of a plurality of factoids from a plurality of sentences;
 assigning one or more factoid tags to each target word in the sentence based on processing of associated input vector through the trained neural network;
 extracting text associated with one or more factoids of the plurality of factoids from the sentence based on the one or more factoid tags associated with each target word in the sentence, wherein the sentence comprises text associated with the one or more factoids; and
 providing a response to the sentence inputted by the user based on the text associated with the one or more factoids, wherein the response comprises at least one of an answer to a user query and an action corresponding to the user query.

\* \* \* \* \*